United States Patent
Feng

(10) Patent No.: US 9,743,309 B2
(45) Date of Patent: Aug. 22, 2017

(54) MAC DESIGN FOR WIRELESS HOT-SPOT NETWORKS

(71) Applicant: Macau University of Science and Technology, Macau (MO)

(72) Inventor: Li Feng, Macau (MO)

(73) Assignee: Macau University of Science and Technology, Macau (MO)

( * ) Notice: Subject to any disclaimer, the term of this patent is extended or adjusted under 35 U.S.C. 154(b) by 99 days.

(21) Appl. No.: 14/945,306

(22) Filed: Nov. 18, 2015

(65) Prior Publication Data

US 2017/0111816 A1   Apr. 20, 2017

Related U.S. Application Data

(60) Provisional application No. 62/243,004, filed on Oct. 17, 2015.

(51) Int. Cl.
*H04W 28/02* (2009.01)
*H04W 74/08* (2009.01)
(Continued)

(52) U.S. Cl.
CPC ......... *H04W 28/021* (2013.01); *H04L 1/1854* (2013.01); *H04L 12/5695* (2013.01); *H04W 74/08* (2013.01); *H04L 47/70* (2013.01)

(58) Field of Classification Search
CPC ................ H04W 28/021; H04W 74/08; H04L 2012/5629; H04L 2012/5695; H04L 47/00; H04L 47/70; H04L 12/5695; H04L 1/1854
See application file for complete search history.

(56) References Cited

U.S. PATENT DOCUMENTS 6,813,260 B1 * 11/2004 Fogle ................ H04W 74/0875
 370/338
7,095,754 B2 * 8/2006 Benveniste ............. H04L 47/10
 370/445

(Continued)

OTHER PUBLICATIONS

ANSI/IEEE Std 802.11, Part 11: wireless LAN medium access control (MAC) and physical layer (PHY) specifications, 1999 Edition (R2007).

(Continued)

*Primary Examiner* — Warner Wong
(74) *Attorney, Agent, or Firm* — Spruson & Ferguson (Hong Kong) Limited

(57) ABSTRACT

In widely deployed wireless "hot-spot" networks, nodes frequently join or leave, inelastic/elastic and saturated/non-satuarted flows coexist. In such dynamic and diverse environments, it is challenging to maximize the channel utilization while providing satisfactory user experiences. In this invention, one proposes a novel contention-on-demand (CoD) MAC scheme to address this problem. The CoD scheme consists of a fixed-CW algorithm, a dynamic-CW algorithm, and an admission control unit. The fixed-CW algorithm allows elastic flows to access limited system bandwidth; the dynamic-CW algorithm enables inelastic flows to contend for channel on demand and quickly adapt to network change; and the admission control unit rejects overloaded traffic for providing good user experiences. One then performs an asymptotic analysis to develop a simple but efficient admission control rule. Finally, extensive simulations verify that the scheme is very effective and the theoretical result is very accurate.

12 Claims, 9 Drawing Sheets

(51) Int. Cl.
*H04L 12/54* (2013.01)
*H04L 1/18* (2006.01)
*H04L 12/911* (2013.01)

(56) References Cited

U.S. PATENT DOCUMENTS

| | | | | |
|---|---|---|---|---|
| 7,274,708 | B2* | 9/2007 | Benveniste | H04L 12/4013 370/338 |
| 7,864,674 | B2* | 1/2011 | Benveniste | H04L 47/10 370/230 |
| 7,983,271 | B2* | 7/2011 | Benveniste | H04L 47/10 370/395.21 |
| 8,532,134 | B2* | 9/2013 | Benveniste | H04L 47/10 370/229 |
| 9,025,455 | B2* | 5/2015 | Lin | H04W 74/0841 370/235 |
| 9,270,606 | B2* | 2/2016 | Benveniste | H04L 47/10 |
| 2005/0152373 | A1* | 7/2005 | Ali | H04L 12/5693 370/395.4 |
| 2006/0187952 | A1* | 8/2006 | Kappes | H04W 74/0875 370/445 |
| 2006/0215686 | A1* | 9/2006 | Takeuchi | H04W 28/18 370/445 |
| 2007/0070902 | A1* | 3/2007 | Elaoud | H04L 12/5695 370/231 |

OTHER PUBLICATIONS

A. Malika, J. Qadirb, B. Ahmada, K. A. Yauc, and U. Ullaha, "Qos in IEEE 802.11-based wireless networks: A contemporary review," Journal of Network and Computer Applications, vol. 55, pp. 24-46, 2015.

Q. L. Zhao, D. H. K. Tsang, and T. Sakurai, "A simple critical-offeredload-based CAC scheme for IEEE 802.11 DCF networks," IEEE/ACM Transactions on Networking, vol. 19, No. 5, pp. 1485-1498, Oct. 2011.

D. Chiu and R. Jain, "Analysis of the increase and decrease algorithms for congestion avoidance in computer networks," Journal of Computer Networks and ISDN, vol. 17, pp. 1-14, 1989.

V. Ramaiyan, A. Kumar, and E. Altman, "Fixed point analysis of single cell IEEE 802.11e WLANs: Uniqueness and multistability," IEEE/ACM Transactions on Networking, vol. 16, No. 5, pp. 1080-1093, Oct. 2008. The corresponding technical report is avalable: http://ece.iisc.ernet.in/ anurag/papers/anurag/ramaiyan-etal05fixedpoint-general.pdf.gz.

Q. L. Zhao, D. H. K. Tsang, and T. Sakurai, "A comprehensive and accurate non-saturated IEEE 802.11e EDCA model for an arbitrary buffer size," IEEE Transactions on Mobile Computing, vol. 12, No. 12, pp. 2455-2469, 2013.

M. Heusse, F. Rousseau, R. Guillier, and A. Duda, "Idle sense: An optimal access method for high throughput and fairness in rate diverse wireless lans," Proceedings of ACM Sigcomm, 2005.

S. H. Nguyen, H. L. Vu, and L. L. H. Andrew, "Performance analysis of ieee 802.11 wlans with saturated and unsaturated sources," IEEE T. Vehicular Technology, vol. 61, No. 1, pp. 333-345, 2012.

G. Bianchi, "Performance analysis of the IEEE 802.11 distributed coordination function," IEEE Journal on Selected Areas in Communications, vol. 18, No. 3, pp. 535-547, Mar. 2000.

D. Malone, K. Duffy, and D. Leith, "Modeling the 802.11 distributed coordination function in non-saturated heterogeneous conditions," IEEE/ACM Transactions on Networking, vol. 15, No. 1, pp. 159-172, Feb. 2007.

R. M. Corlessa, G. H. Gonnet, D. E. G. Hare, D. J. Jeffrey, and D. E. Knuth, "On the lambert w function," Adv. Comput. Math., vol. 5, pp. 329-359, 1996.

M. Nassiri, M. Heusse, and A. Duda, "A novel access method for supporting absolute and proportional priorities in 802.11 WLANs," INFOCOM, pp. 709-717, 2008.

Z. Ma, Q. Zhao, and T. H. Luan, "Providing utility-optimal throughput guarantees in wireless lans," IEEE Transactions Vehicular Technology. Accepted for publication.

A. Kumar, E. Altman, D. Miorandi, and M. Goyal, "New insights from a fixed point analysis of single cell ieee 802.11 wlans," IEEE/ACM Transactions on Networking, vol. 15, No. 3, pp. 588-601, Mar. 2007.

* cited by examiner

MAC DESIGN FOR WIRELESS HOT-SPOT NETWORKS

CROSS-REFERENCE TO RELATED APPLICATIONS

This application claims the benefit of U.S. Provisional Patent Application No. 62/243,004, filed on Oct. 17, 2015, which is incorporated by reference herein in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to a method for providing admission control to a wireless network system.

BACKGROUND

The following references are cited in the specification. Disclosures of these references are incorporated herein by reference in their entirety.

LIST OF REFERENCES

[1]. ANSI/IEEE Std 802.11, Part 11: wireless LAN medium access control (MAC) and physical layer (PHY) specifications, 1999 Edition (R2007).
[2]. A. Malika, J. Qadirb, B. Ahmada, K. A. Yauc, and U. Ullaha, "Qos in IEEE 802.11-based wireless networks: A contemporary review," Journal of Network and Computer Applications, vol. 55, pp. 24-46, 2015.
[3]. M. Burton, "Hotspot 2.0 and the next generation hotspot," April 2013. Available: https://www.cwnp.com/hotspot-2-0-and-the-next-generationhotspot.
[4]. K. Fitchard, "Hotspot 2.0 inches its way into public wi-fi networks," March 2014. Available: https://gigaom.com/2014/03/07/hotspot-2-0-inches-its-way-into-public-wi-fi-networks/.
[5]. https://en.wikipedia.org/wiki/Hotspot (Wi-Fi).
[6]. Q. L. Zhao, D. H. K. Tsang, and T. Sakurai, "A simple critical-offeredload-based CAC scheme for IEEE 802.11 DCF networks," IEEE/ACM Transactions on Networking, vol. 19, no. 5, pp. 1485-1498, October 2011.
[7]. D. Chiu and R. Jain, "Analysis of the increase and decrease algorithms for congestion avoidance in computer networks," Journal of Computer Networks and ISDN, vol. 17, pp. 1-14, 1989.
[8]. V. Ramaiyan, A. Kumar, and E. Altman, "Fixed point analysis of single cell IEEE 802.11e WLANs: Uniqueness and multistability," IEEE/ACM Transactions on Networking, vol. 16, no. 5, pp. 1080-1093, October 2008. The corresponding technical report is avalable: http://ece.iisc.ernet.in/anurag/papers/anurag/ramaiyan-eta105fixedpoint-general.pdf.gz.
[9]. Q. L. Zhao, D. H. K. Tsang, and T. Sakurai, "A comprehensive and accurate non-saturated IEEE 802.11e EDCA model for an arbitrary buffer size," IEEE Transactions on Mobile Computing, vol. 12, no. 12, pp. 2455-2469, 2013.
[10]. M. Heusse, F. Rousseau, R. Guillier, and A. Duda, "Idle sense: An optimal access method for high throughput and fairness in rate diverse wireless lans," Proceedings of ACM Sigcomm, 2005.
[11]. S. H. Nguyen, H. L. Vu, and L. L. H. Andrew, "Performance analysis of ieee 802.11 wlans with saturated and unsaturated sources," IEEE T. Vehicular Technology, vol. 61, no. 1, pp. 333-345, 2012.
[12]. G. Bianchi, "Performance analysis of the IEEE 802.11 distributed coordination function," IEEE Journal on Selected Areas in Communications, vol. 18, no. 3, pp. 535-547, March 2000.
[13]. http://www.isi.edu/nsnam/ns/ns-build.html.
[14]. D. Malone, K. Duffy, and D. Leith, "Modeling the 802.11 distributed coordination function in non-saturated heterogeneous conditions," IEEE/ACM Transactions on Networking, vol. 15, no. 1, pp. 159-172, February 2007.
[15]. R. M. Corlessa, G. H. Gonnet, D. E. G. Hare, D. J. Jeffrey, and D. E. Knuth, "On the lambert w function," Adv. Comput. Math., vol. 5, pp. 329-359, 1996.
[16]. M. Nassiri, M. Heusse, and A. Duda, "A novel access method for supporting absolute and proportional priorities in 802.11 WLANs," INFOCOM, pp. 709-717, 2008.
[17]. Z. Ma, Q. Zhao, and T. H. Luan, "Providing utility-optimal throughput guarantees in wireless lans," IEEE Transactions Vehicular Technology. Accepted for publication.
[18]. A. Kumar, E. Altman, D. Miorandi, and M. Goyal, "New insights from a fixed point analysis of single cell ieee 802.11 wlans," IEEE/ACM Transactions on Networking, vol. 15, no. 3, pp. 588-601, March 2007.

IEEE 802.11 standard [1] has become the dominating solution for wireless "hot-spot" networks [2][3][4][5] at many public places, such as hotels, airports, restaurants, and malls. The salient features of "hot-spot" networks include (i) nodes frequently join and leave, and (ii) traffic is very diverse and heterogeneous. For example, in "hot-spot" networks, inelastic applications (such as video, audio) and elastic applications (such as reading Web pages, e-mail) coexist, and saturated (where a node always has packets to transmit) and non-saturated flows coexist.

However, current 802.11 networks have the following drawbacks: (i) the network capacity is not fully exploited since the protocol parameters such as contention window (CW) is statically configured, failing to adapt to the change in the node number and the packet size, (ii) the system performance (such as throughput and delay) deteriorates significantly if the offered load slightly exceeds a critical value [6], (iii) there is not an admission control unit that limits the admitted traffic loads. These drawbacks naturally lead to a very bad user experience in such dynamic and diverse "hot-spot" networks if traffic becomes congested.

In related works, [8][9], respectively, analyzed the saturated and non-saturation performance of 802.11 networks. [10] proposed a scheme to maximize the channel utilization of saturated 802.11 networks. [11] developed a performance model to analyze the 802.11 performance when non-saturated and saturated flows coexist. However, none of these works consider the objectives: designing a distributed scheme for maximizing the channel utilization and providing satisfactory QoS when inelastic and elastic flows coexist.

SUMMARY OF THE INVENTION

In this invention, one targets to devise a contention-on-demand (CoD) MAC scheme for fully utilizing the available system bandwidth and providing satisfactory user experiences, in wireless "hot-spot" networks. The CoD scheme consists of two distributed algorithms (i.e., a fixed-CW algorithm and a dynamic-CW algorithm) and an admission control unit. The fixed-CW algorithm is a variant of the 802.11 inherent binary-exponential-backoff (BEB) algorithm; this algorithm limits the use of the system bandwidth and is adopted by each elastic flow. The dynamic-CW algorithm is built on the famous additive-increase-multiplicative-decrease (AIMD) rule [7]; this algorithm will enable each inelastic flow to contend for neither more nor less than its required bandwidth, quickly adapt to the change of network states, as well as maximize the channel utilization. The admission control unit limits the admitted traffic load for providing satisfactory user experiences. One then performs an asymptotic analysis on the system throughput of the inelastic flows. On this basis, one develops a simple but efficient admission control rule. Finally, extensive simulations verify that the CoD scheme is very effective and the theoretical result is very accurate.

An aspect of the present invention is to provide methods for providing admission control to a wireless network system are set forth as preferred examples.

According to an embodiment of the present invention, a computer-implemented method for providing admission control to a wireless network system, the system having one or more high-priority (HP) nodes, one or more low-priority (LP) nodes, contending for access to an access point, the method comprises:

categorizing the system into one LP access category (AC) and I HP ACs, wherein the LP AC has $n_0$ LP nodes, and each of the LP nodes has a same packet size $L_0$ and generates a random backoff count uniformly distributed in $[0, CW_0]$ for each of new transmission or retransmission, where $CW_0$ is a pre-configured contention window (CW) size required by a fixed-CW algorithm, and wherein the HP AC i, where $1 \le i \le I$, has $n_i$ HP nodes, where $n_1 + L + n_I = n$ is a total number of HP nodes, and each of the HP nodes in the HP AC i has a same packet size $L_i$ and a same packet arrival rate $\lambda_i$, and generates a random backoff count uniformly distributed in $[0, CWD]$ for each of new transmission or retransmission, where CWD is a contention window size dynamically set by a dynamic-CW algorithm;

setting all of the LP and HP nodes having the packet size with L;

determining an optimal asymptotic HP attempt rate as follows:

$$\beta_{opt}^+ = W_0\left(\frac{C_0(\sigma - T_c)}{eT_c}\right) + 1$$

where $w_0(\cdot)$ is a Lambert W(z) function, $W(z)e^{W(z)}=z$, for any complex number z, $\sigma$ is a length of a media access control MAC slot, $C_0 \triangleq (1-\beta_0)^{n_0}$, $n_0$ is the total number of LP nodes, $\beta_0$ is an average attempt rate per slot for each of the LP AC nodes, $T_c$ is a mean time in slots for an unsuccessful transmission;

determining an optimal asymptotic HP throughput $\Gamma_1(\beta_{opt}^+)$ by substituting the $\beta_{opt}^+$ for $\beta^+$ in $\Gamma_1(\beta^+)$ as follows:

$$\Gamma_1(\beta^+) = \frac{e^{-\beta^+}\beta^+ C_0 L}{T_c + e^{-\beta^+}[\sigma - T_c]C_0}$$

where $\Gamma_1(\beta^+)$ is an asymptotic total HP throughput, and $\beta^+$ is a total asymptotic HP attempt rate;

determining one or more numerical values of operating parameters including $\lambda_i$ such that $\Sigma_{i=1}^{I} n_i \lambda_i L < \Gamma_1(\beta_{opt}^+)$, where $\Sigma_{i=1}^{I} n_i \lambda_i L$ is a total traffic load of all of the HP ACs;

determining the CWD based on a requirement of total delay of a flow.

Preferably, the total delay of the flow is related to the determined numerical values of $\lambda_i$.

Preferably, the total traffic load of all of the HP ACs is just slightly below the optimal asymptotic HP throughput.

According to another embodiment of the present invention, a computer-implemented method for providing admission control to a wireless network system, the system having one or more high-priority (HP) nodes, one or more low-priority (LP) nodes, contending for access to an access point, the method comprises:

categorizing the system into one LP access category (AC) and I HP ACs, wherein the LP AC has $n_0$ LP nodes, and each of the LP nodes has a same packet size $L_0$ and generates a random backoff count uniformly distributed in $[0, CW_0]$ for each of new transmission or retransmission, where $CW_0$ is a pre-configured contention window (CW) size required by a fixed-CW algorithm, and wherein the HP AC i, where $1 \le i \le I$, has $n_i$ HP nodes, where $n_1 + L + n_I = n$ is a total number of HP nodes, and each of the HP nodes in the HP AC i has a same packet size $L_i$ and a same packet arrival rate $\lambda_i$, and generates a random backoff count uniformly distributed in $[0, CWD]$ for each of new transmission or retransmission, where CWD is a contention window size dynamically set by a dynamic-CW algorithm;

determining an optimal asymptotic aggregate attempt rate as follows:

$$\beta_{opt}^+ = W_0\left(\frac{C_0(\sigma - T_c) + C_1(T_{s_0} - T_c)}{eT_c}\right) + 1$$

where $w_0(\cdot)$ is a Lambert W(z) function, $W(z)e^{W(z)}=z$, for any complex number z, $\sigma$ is a length of a media access control MAC slot, $C_0 \triangleq (1-\beta_0)^{n_0}$, $C_1 \triangleq n_0 \beta_0 (1-\beta_0)^{n_0-1}$, $n_0$ is the total number of LP nodes, $\beta_0$ is an average attempt rate per slot for each of the LP AC nodes, $T_c$ is a mean time in slots for an unsuccessful transmission, $Ts_0$ is a mean time in slots of a successful transmission for each of the AC 0 nodes, determining a maximum HP throughput $\Gamma_2(\beta_{opt}^+, r_1, L, r_I)$ by substituting the $\beta_{opt}^+$ for $\beta^+$ in $\Gamma_2(\beta^+, r_1, L, r_I)$ as follows:

$$\Gamma_2(\beta^+, r_1, L, r_l) = \frac{\beta^+ e^{-\beta^+} C_0 D_0(r_1, L, r_l)}{e^{-\beta^+} C_0[\sigma + \beta^+ D_1(r_1, L, r_l) + C_1 T_{s_0}/C_0] + [1 - e^{-\beta^+}(C_0 + C_1 + \beta^+ C_0)]T_c}$$

where $\Gamma_2(\beta^+, r_1, L, r_l)$ is a maximum system throughput, $\beta^+$ is a total asymptotic HP attempt rate, $$D_0(r_1, L, r_l) = \frac{\sum_{i=1}^{l} r_i}{\sum_{i=1}^{l} \frac{r_i}{L_i}}, \quad D_1(r_1, L, r_l) = \frac{\sum_{i=1}^{l} \frac{r_i}{L_i} T_{s_i}}{\sum_{i=1}^{l} \frac{r_i}{L_i}},$$

$r_i$ is a ratio between HP AC i and AC 1 throughput,
$T_{s_i}$ is a mean time in slots of a successful transmission for each of the AC i nodes,
determining one or more numerical values of operating parameters including $\lambda_i$ such that $\Sigma_{i=1}^{I} n_i \lambda_i L_i < \Gamma_2(\beta_{opt}^+, r_1, L, r_l)$
where $\Sigma_{i=1}^{I} n_i \lambda_i L_i$ is a total traffic load of all of the HP ACs;
determining the CWD based on a requirement of total delay of a flow.

Preferably, the total delay of the flow is related to the determined numerical values of $\lambda_i$.

Preferably, the total traffic load of all of the HP ACs is just slightly below the maximum HP throughput.

BRIEF DESCRIPTION OF THE DRAWINGS

Embodiments of the present invention are described in more detail hereinafter with reference to the drawings, in which.

DETAILED DESCRIPTION

Figure 1:
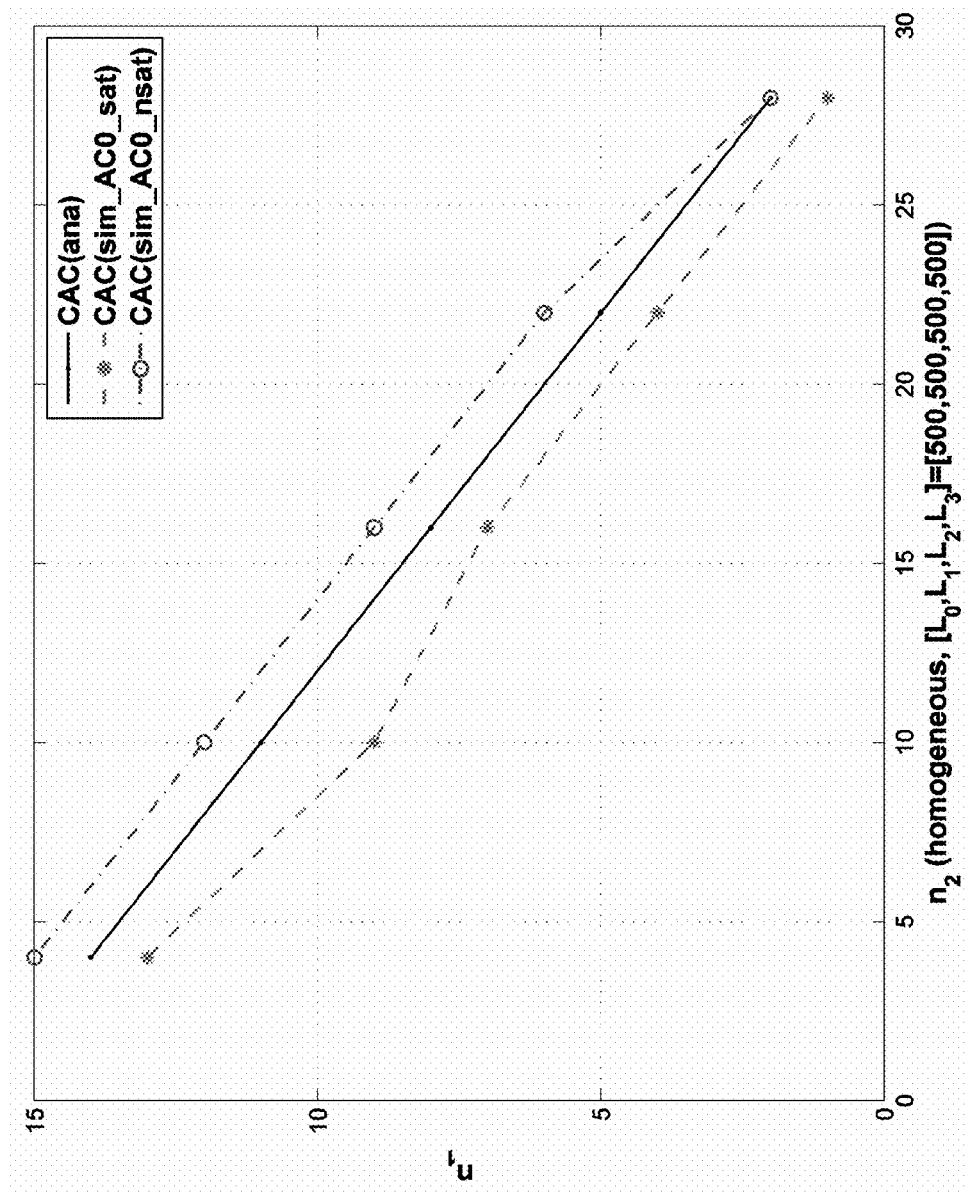
FIG. 1 depicts admission region of AC 1 when $n_2$=4, 10, 16, 22, 28 for homogeneous traffic.

In the following description, methods for providing admission control to a wireless network system are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The present invention is devoted to designing a novel scheme for maximizing channel utilization and providing satisfactory QoS in wireless "hot-spot" networks. Then a theoretical model is developed to analyze the proposed scheme. Extensive simulations verify that the scheme is very effective and the theoretical result is very accurate.

Accordingly, Section A presents the proposed CoD scheme. Section B performs an asymptotic analysis for admission control. Section E validates the effectiveness of the proposed scheme and the accuracy of the theoretical result.

A. The Proposed CoD Scheme

In this section, one presents the proposed contention-on-demand (CoD) MAC scheme.

CoD is a parameterized quality-of-service (QoS)-oriented scheme. CoD employs the CSMA feature in IEEE 802.11 DCF, but replaces the BEB algorithm by one fixed-CW algorithm and one dynamic-CW algorithm. In the fixed-CW algorithm, the CW keeps unchanged for all flows that adopt this algorithm. The fixed-CW algorithm provides best-effort service for low-priority (LP) flows or elastic flows. In the dynamic-CW algorithm, the CW is dynamically adjusted by the AIMD algorithm, so as to adapt to QoS requirements of each flow that adopts this algorithm. The dynamic-CW algorithm provides QoS service for high-priority (HP) flows or inelastic flows. Once the CW is determined, each node chooses a backoff count that is uniformly distributed in the CW, and then performs backoff like 802.11 DCF.

In addition, CoD also employs an admission control unit to limit the total traffic load of HP flows. When the system resource is available, AIMD has the property of converging to equal values of the control variable [7]. The admission control is used to ensure that the system resource is available.

Let CWD denote current CW size. Below, one first presents the fixed-CW and dynamic-CW algorithms, and then present the admission control.

A.1. Fixed-CW Algorithm

The fixed-CW algorithm requires a pre-configured CW size denoted by $CW_0$. In the algorithm, $CWD=CW_0=400$.

A.2. Dynamic-CW Algorithm

The dynamic-CW algorithm adjusts the CW size according to the well-known AIMD algorithm. This algorithm requires five pre-configured parameters: $CW_{init}$ (the initial CW size), $CW_{min}$ (the minimum CW size), $CW_{max}$ (the maximum CW size), $f_{ai}$ (the additive-increase factor), and $f_{md}$ (the multiplicative-decrease factor).

---

Algorithm 1 Dynamic-CW (delay$_i$, pktIntval)

1: Init: $CW_{init}$=400; $CW_{min}$=10; $CW_{max}$=10$^3$; $f_{ai}$=10; $f_{md}$=0.93; delayAVG=0; $CW_a$=$CW_{init}$.
2: if Transmit the i-th packet then
3:    CWD=$CW_{init}$ if i=1; $CW_a$ otherwise.
4: end if
5: if Receive ACK of the i-th packet then
6:    delayAVG+=(delay$_i$−delayAVG)/i++.
7:    if delayAVG<pktIntval then
8:       $CW_a$=$CW_a$+$f_{ai}$.
9:    else
10:      $CW_a$=$CW_a$ × $f_{md}$.
11:    end if
12:    $CW_a$=max(min($CW_a$, $CW_{max}$), $CW_{min}$)
13: end if

---

Algorithm 1 presents an example making the total delay converge to the packet arrival interval of a flow. In this way, one desires to guarantee the throughput stability (namely, the throughput of a flow is equal to its offered load). In this algorithm, one has two inputs: delay$_i$ denoting the total delay of the i-th acknowledged packet of a flow, and pktIntval denoting the average packet arrival interval of the flow. When a flow is admitted to transmit its packets, CWD is set to CW$_{init}$ for its first packet transmission and is set to CW$_a$ for the subsequent transmissions. CW$_a$ is set by the AIMD algorithm, in order to ensure that the total average delay, delayAVG, converges to pktIntval. To this end, one first calculates delayAVG (in line 6 of Algorithm 1), and then compare delayAVG with pktIntval. If delayAVG<pktIntval, one increases CW$_a$ (in line 8) and decrease CW$_a$ (in line 10) otherwise.

One now explains the calculation of delayAVG (in line 6). Let delayAVG$_n$ denote the average of first n total delays, namely $$delayAVG_n = \frac{delay_1 + \ldots + delay_n}{n}.$$

Then, one has $$delayAVG_{n+1} = \frac{delay_1 + \ldots + delay_{n+1}}{n+1} \quad (1)$$

$$= \frac{delay_{n+1} + n \times delayAVG_n}{n+1}$$

$$= \frac{delay_{n+1} + (n+1) \times delayAVG_n - delayAVG_n}{n+1}$$

$$= delayAVG_n + \frac{delay_{n+1} - delayAVG_n}{n+1}.$$

Eq. (1) manifests that one only needs to store delayAVG$_n$ (instead of delay$_1$, . . . , delay$_n$), so that one can calculate delayAVG$_{n+1}$ by delay$_{n+1}$. The expression of delayAVG (in line 6) illustrates the computational form of (1) in programming.

In general, Algorithm 1 can make the total delay converge to the delay target of a flow. Therefore, one may replace the second input parameter in Algorithm 1, pktIntval, by delayTarget denoting the total delay requirement of a flow. When delayTarget is set to pktIntval, Algorithm 1 guarantees the throughput stability of a flow.

A.3. Admission Control

To ensure that the dynamic-CW algorithm can provide satisfactory QoS service for HP flows, one requires that the total traffic load, $\Sigma_{i=1}^I n_i \lambda_i L_i$, should be below a upper bound $\Lambda$, namely, $$\Sigma_{i=1}^I n_i \lambda_i L_i < \Lambda,$$

where one assumes that HP traffic is classified into I access categories (ACs), $n_i$, $\lambda_i$, and $L_i$, respectively, represent the node number, the packet arrival rate, and the packet size of AC i.

In the following sections, one seeks the optimal upper bound $\Lambda$.

B. Asymptotic HP Throughput

In this section, one performs an asymptotic analysis to derive the optimal upper bound $\Lambda$ mentioned in Section A.3.

One assumes that the system, running the CoD schemes, consists of one LP AC and I HP ACs. All data packets from HP and LP nodes are transmitted to the AP, and the AP acts purely as the receiver of data packets.

The LP AC 0 has $n_0$ nodes. Each LP node has the same packet size $L_0$ and always generates a random backoff count uniformly distributed in [0,CW$_0$] for each new transmission or retransmission, where CW$_0$>1. one assumes that each LP node is in saturation operation (i.e., the node always has packets to transmit) because here one studies the maximum stable throughput that HP ACs can achieve, regardless of how the LP offered loads vary.

Each HP AC i, $1 \leq i \leq I$, has $n_i$ nodes, where $n_1+L+n_I=n$. Each HP i node has the same packet size $L_i$ and packet arrival rate $\lambda_i$, and always generates a random backoff count uniformly distributed in [0,CWD] for each new transmission or retransmission, where CWD is dynamically set by the dynamic-CW algorithm.

B.1 Exact HP Throughput

Let $\beta_0$ be the average attempt rate per slot for each LP AC node on the condition that the buffer is not empty. From [12], one has $\beta_0=2/(CW_0+1)$.

Let $\beta_i$, i=1,L,I, be the average attempt rate per slot for each HP AC i node on the condition that all LP AC nodes will not transmit.

Let $\Omega$ be the mean time that elapses for one decrement of the backoff counter. The generic slot $\Omega$ takes different values depending on whether the slot is idle, interrupted by a successful transmission, or a collision. In terms of $\beta_0,\beta_1,L,\beta_I$, one has $$\Omega = (1 - P_b)\sigma + \sum_{i=0}^{I} P_{s_i} T_{s_i} + P_c T_c, \quad (2)$$

where $$P_b = 1 - \prod_{j=0}^{I}(1-\beta_j)^{n_j},$$

$$P_{s_i} = n_i \beta_i \frac{\prod_{j=0}^{I}(1-\beta_j)^{n_j}}{(1-\beta_i)},$$

$$P_c = P_b - \sum_{j=0}^{I} P_{s_j}.$$

In (2), $\sigma$ is the length of one MAC slot, i.e., $\sigma$=1 slot, $T_{s_i}$ is the mean time (in slots) of a successful transmission for each AC i node; $T_c$ is the mean time (in slots) for an unsuccessful transmission; $P_b$ is the probability of a busy slot; $P_{s_i}$ is the probability of a successful packet transmission for each AC i node; and $P_c$ is the probability of an unsuccessful packet transmission.

Exact HP Throughput: Let $\Gamma_i(n,\beta_1,L,\beta_I)$ be the HP AC i throughput, which is defined to be the number of bits transmitted successfully by all HP AC i nodes in the time interval of $\Omega$. Let $\Gamma(n,\beta_1,L,\beta_I)$ be the total HP throughput. one has $$\Gamma_i(n, \beta_1, L, \beta_I) = \frac{P_{s_i} L_i}{\Omega}. \quad (3)$$

$$\Gamma(n, \beta_1, L, \beta_I) = \sum_{i=1}^{I} \Gamma_i(n, \beta_1, L, \beta_I).$$

B.2. Asymptotic HP Throughput

One starts with the asymptotic assumption below.

Asymptotic assumption: To perform asymptotic analysis, one assumes that $$n \to \infty \text{ and } \beta_i^+ \triangleq \lim_{n \to \infty} n_i \beta_i \leq 0 \quad (4)$$

where $\beta_i^+$ is called the asymptotic attempt rate of HP AC i nodes.

Let us define $C_0 \triangleq (1-\beta_0)^{n_0}$, $C_1 \triangleq n_0\beta_0(1-\beta_0)^{n_0-1}$, $\beta^+ \triangleq \sum_{i=1}^{I} \beta_i^+$ where $\beta^+$ is called the total asymptotic HP attempt rate. Then, under assumption (4), applying Poisson approximation to (2), one has $$\lim_{n\to\infty} P_b = 1 - e^{-\beta^+} C_0, \quad (5)$$

$$\lim_{n\to\infty} P_{s_i} = \beta_i^+ e^{-\beta^+} C_0, \text{ for } 1 < i < I,$$

$$\lim_{n\to\infty} \sum_{i=1}^{I} P_{s_i} = \beta^+ e^{-\beta^+} C_0,$$

$$\lim_{n\to\infty} P_{s_0} = e^{-\beta^+} C_1,$$

$$\lim_{n\to\infty} P_c = 1 - e^{-\beta^+}(C_0 + C_1 + \beta^+ C_0),$$

$$\lim_{n\to\infty} \sum_{i=1}^{I} P_{s_i} T_{s_i} = e^{-\beta^+} C_0 \sum_{i=1}^{I} \beta_i^+ T_{s_i},$$

$$\lim_{n\to\infty} \Omega = e^{-\beta^+} C_0 \left[\sigma + \sum_{i=1}^{I} \beta_i^+ T_{s_i} + C_1 T_{s_0}/C_0\right] + [1 - e^{-\beta^+}(C_0 + C_1 + \beta^+ C_0)] T_c.$$

Asymptotic HP throughput: Let $$\Gamma(\beta_1^+, L, \beta_I^+) \lim_{n\to\infty} \Gamma(n, \beta_1, L, \beta_I)$$

be the total asymptotic HP throughput. From (5) and (3), $\Gamma(\beta_1^+, L, \beta_I^+)$, is given by $$\Gamma(\beta_1^+, L, \beta_I^+) \quad (6)$$

$$= \frac{e^{-\beta^+} C_0 \sum_{i=1}^{I} \beta_i^+ L_i}{e^{-\beta^+} C_0 \left[\sigma + \sum_{i=1}^{I} \beta_i^+ T_{s_i} + C_1 T_{s_0}/C_0\right] + [1 - e^{-\beta^+}(C_0 + C_1 + \beta^+ C_0)] T_c} \quad (7)$$

where $L_i$ is the packet size for AC i node.

C. Admission Control for Homogeneous Traffic

In this section, one focuses on homogeneous traffic, where all nodes have the same packet size L, namely $L_0 = L_1 = \ldots = L_I \equiv L$. Below, one first optimizes the total asymptotic HP attempt rate $\beta^+$, and then specify the admission control rule.

C.1. Optimal Asymptotic HP Attempt Rate

For homogeneous traffic, one can further assume $T_c = T_{s_i}$. This assumption states that the ACK timeout matches one successful transmission time. It has been implemented in NS2 [13] and has widely been used in previous works such as [14]. Then, $\Omega$ in (2) and $\lim_{n\to\infty} \Omega$ in (5) reduce to $$\Omega = (1 - P_b)\sigma + P_b T_c \quad (8)$$

$$\lim_{n\to\infty} \Omega = T_c + e^{-\beta^+}[\sigma - T_c]C_0.$$

Therefore, $\Gamma(\beta_1^+, L, \beta_I^+)$ in (6) can be expressed in terms of $\beta^+$. Let $\Gamma_1(\beta^+) \Gamma(\beta_1^+, L, \beta_I^+)$. one has $$\Gamma_1(\beta^+) = \frac{e^{-\beta^+} \beta^+ C_0 L}{T_c + e^{-\beta^+}[\sigma - T_c]C_0}. \quad (9)$$

Let $\beta_{opt}^+$ represent the optimal $\beta^+$ that maximizes the asymptotic total HP throughput (9). Theorem 1 explicitly expresses $\beta_{opt}^+$.

Theorem 1. Under assumption (4), if $T_c = T_{s_i}$, $\beta_{opt}^+$ is $$\beta_{opt}^+ = W_0\left(\frac{C_0(\sigma - T_c)}{eT_c}\right) + 1, \quad (10)$$

where $W_0(\cdot)$ is one branch of the Lambert W(z) function [15], $W(z)e^{W(z)} = z$, for any complex number z.

Proof To maximize $\Gamma_1(\beta^+)$, one sets the first derivative of $\Gamma_1(\beta^+)$ in (9) with respect to $\beta^+$ to zero. This leads to $T_c \beta^+ = C_0(\sigma - T_c)e^{-\beta^+} + T_c$ $T_c(\beta^+ - 1) = C_0(\sigma - T_c)e^{-\beta^+}$ $(\beta^+ - 1)e^{(\beta^+ - 1)} = C_0(\sigma - T_c)e^{-1}/T_c.$ Then $\beta^+ - 1 = W_0(C_0(\sigma - T_c)e^{-1}/T_c)$ or $W_{-1}(C_0(\sigma - T_c)e^{-1}/T_c)$. one has $\beta_{opt}^+ = W_0(C_0(\sigma - T_c)e^{-1}/T_c) + 1 \geq 0$, since only $W_0(C_0(\sigma - T_c)e^{-1}/T_c) > -1$ for $C_0(\sigma - T_c)e^{-1}/T_c \in (-1/e, 0)$.

When $n_0 = 0$ and $I = 1$ (i.e., the system has 1 HP AC and has not LP nodes), $\beta_{opt}^+$ reduces to the solution to (10) in [10].

C.2. Admission Control

To provide satisfactory QoS, the total traffic load of all HP ACs, $\sum_{i=1}^{I} n_i \lambda_i L$, should be below the optimal asymptotic HP throughput $\Gamma_1(\beta_{opt}^+)$, namely, $$\beta_{i=1}^{I} n_i \lambda_i L < \Gamma_1(\beta_{opt}^+), \quad (11)$$

where $\Gamma_1(\cdot)$ is given in (9).

From (9)-(10), one knows that for homogeneous traffic, the maximum total HP throughput keeps unchanged, regardless of how the node number and the packet arrival rate of HP nodes vary; therefore, one only needs to compute the total offered load for admission control, as shown in (11).

D. Admission Control for Heterogeneous Traffic

In this section, one focuses on heterogeneous traffic, where different ACs have different packet sizes. Below, one first optimizes the total asymptotic HP attempt rate $\beta^+$, and then specify the admission control rule.

D.1. Optimal Asymptotic Aggregate Attempt Rate

Let $\beta_{opt}^+$ represent the optimal $\beta^+$ that maximizes the asymptotic total HP throughput (6). Theorem 2 explicitly expresses $\beta_{opt}^+$.

Theorem 2. Under assumption (4), if $$[C_0(\sigma - T_c) + C_1(T_{s_0} - T_c)]/T_c \in (-1, 0), \quad (12)$$

$$\beta_{opt}^+ \text{ is } \beta_{opt}^+ = W_0\left(\frac{C_0(\sigma - T_c) + C_1(T_{s_0} - T_c)}{eT_c}\right) + 1.$$

where $W_0(\cdot)$ is one branch of the Lambert W(z) function [15], $W(z)e^{W(z)}=z$, for any complex number z.

(i) Theorem 2 manifests that the optimal asymptotic HP attempt rate is independent of the HP traffic characteristics, because $\beta_{opt}^+$ in (12) only depends on the LP transmission time $T_{s_0}$ and the common collision time $T_c$. (ii) Theorem 1 is a special case of Theorem 2, because (12) reduces to (10) if one sets $T_{s_0}=T_c$.

D.2. Admission Control

In this section, for heterogeneous traffic, one develops an admission control rule. Before this, one first calculates the maximum system throughput.

From (6) and Theorem 2, the maximum system throughput depends on not only the optimal total HP attempt rate but also the HP packet size. To express the maximum system throughput in terms of $\beta_{opt}^+$, one adopts a key approximation, $\beta_i \ll 1$, which is widely used in the related literatures such as [16][17]. The approximation holds true since $\beta_i$ represents the per-node attempt rate in a very short slot (e.g., 1 slot=20 μs in 802.11b) and therefore it is generally much less than 1.

Let $$r_i \triangleq \lim_{n\to\infty} \frac{r_i}{\Gamma_1}$$

be the ratio between HP AC i and AC 1 throughput. With the approximation $\beta_i \ll 1$, and the assumption (4), one has $$r_i = \lim_{n\to\infty} \frac{\Gamma_i}{\Gamma_1}$$

$$= \lim_{n\to\infty} \frac{P_{s_i} L_i}{P_{s_1} L_1}$$

$$= \lim_{n\to\infty} \left[\frac{n_i \beta_i}{n_1 \beta_1} \frac{1-\beta_1}{1-\beta_i} \frac{L_i}{L_1}\right]$$

$$= \frac{\beta_i^+}{\beta_1^+} \frac{L_i}{L_1}.$$

Then, one has $$\beta_i^+ = \frac{r_i L_1 \beta_1^+}{L_i},$$

$$\beta^+ = \sum_{i=1}^{I} \beta_i^+ = \sum_{i=1}^{I} \frac{r_i}{L_i} L_1 \beta_1^+,$$

$$L_1 \beta_1^+ = \frac{\beta^+}{\sum_{i=1}^{I} \frac{r_i}{L_i}}.$$

Hence, $\beta_i^+$ can be expressed in terms of $\beta^+$.

$$\beta_i^+ = \frac{r_i L_1 \beta_1^+}{L_i} = \frac{r_i}{L_i} \frac{\beta^+}{\sum_{i=1}^{I} \frac{r_i}{L_i}}. \quad (13)$$

Let us define $D_0(r_1,L,r_I)$ and $D_1(r_1,L,r_I)$ as follows.

$$D_0(r_1, L, r_I) = \frac{\sum_{i=1}^{I} r_i}{\sum_{i=1}^{I} \frac{r_i}{L_i}}, \quad (14)$$

$$D_1(r_1, L, r_I) = \frac{\sum_{i=1}^{I} \frac{r_i}{L_i} T_{s_i}}{\sum_{i=1}^{I} \frac{r_i}{L_i}}.$$

Substituting (13) and (14) into (6), one has $\Gamma(\beta_1^+,L,\beta_I^+) \approx \Gamma_2(\beta^+,\{r_i\})$, where $$\Gamma_2(\beta^+, r_1, L, r_I) = \frac{\beta^+ e^{-\beta^+} C_0 D_0(r_1, L, r_I)}{e^{-\beta^+} C_0[\sigma + \beta^+ D_1(r_1, L, r_I) + C_1 T_{s_0}/C_0] +} \quad (15)$$
$$[1 - e^{-\beta^+}(C_0 + C_1 + \beta^+ C_0)]T_c$$

CAC rule: Let $\Lambda_i = n_i \lambda_i L_i$ denote the total traffic load of HP AC i. For admission control, one will ensure that the system throughput $\Gamma_i$ of HP AC i is equal to its total offered load $\Lambda_i$, namely, $\Gamma_i = \Lambda_i$. Then, one can approximately calculate $r_i$ as follows.

$$r_i \approx \frac{\Gamma_i}{\Gamma_1} = \frac{\Lambda_i}{\Lambda_1} = \frac{n_i \lambda_i L_i}{n_1 \lambda_1 L_1}. \quad (16)$$

To provide satisfactory QoS, given $C_i$, $L_i$, and $D_i$, the total traffic load of all HP ACs, $\sum_{i=1}^{I} n_i \lambda_i L$, should be below the maximum HP throughput $\Gamma_2(\beta_{opt}^+,r_1,L,r_I)$, namely, $$\sum_{i=1}^{I} n_i \lambda_i L_i < \Gamma_2(\beta_{opt}^+, r_1, L, r_I). \quad (17)$$

From the CAC rule, one has the following observations.
1 From (15), one knows that for heterogeneous traffic, the maximum total HP throughput varies as the ratio $r_i$ between offered loads varies; therefore, one needs to compute both the total offered load and the maximum total HP throughput for admission control, as shown in (17). This is a striking difference from the case of homogeneous traffic.

The CAC rule (17) is applicable for homogeneous traffic, because (17) reduces to (11) if each AC has the same packet size and $T_c = T_{s_i}$.

The CAC rule (17) is also applicable for homogeneous IEEE 802.11 DCF networks. The reasons are: the CoD system becomes the homogeneous IEEE 802.11 DCF network, if $n_0=0$ and I=1 (hence $C_0=1$, $C_1=0$), $L_i \equiv L$, and the only AC adopts the binary-exponential-backoff algorithm. As a result, one has $$\beta_{opt}^+ = \ln\frac{b}{b-1}$$

[18][6]; (15) reduces to (22) in [6]; and the CAC rule (17) becomes the CAC rule in DCF (i.e., Table II in [6]).

E. Model Verification

TABLE 1

Parameters for 802.11 b basic mode.

| | | | | | |
|---|---|---|---|---|---|
| $CW_0$ | 32 | Header | 243 µs | = | Mheader + Pheader + RouteHeader |
| m/M | 5/7 | $T_s$ | | = | Header + $L_{tm}$ + SIFS + δ + ACK + δ + DIFS |
| σ | 1 slot | $T_s^-$ | | = | $T_s$ |
| δ | 0 µs | $L_{tm}$ | | = | L bytes @ $R_{data}$ |
| SIFS | 10 µs | ACK | 304 µs | = | 24 bytes @ $R_{basic}$ + 14 bytes @ $R_{basic}$ |
| DIFS | 50 µs | Mheader | 22 µs | = | 26 bytes @ $R_{data}$ + 4 bytes @ $R_{data}$ |
| $R_{data}$ | 11 Mbps | Pheader | 192 µs | = | 24 bytes @ $R_{basic}$ |
| $R_{basic}$ | 1 Mbps | RouteHeader | 29 µs | = | 40 bytes @ $R_{data}$ |

In this section, one demonstrates the effectiveness of the proposed CAC scheme. one uses the 802.11 simulator in ns2 version 2.28 [13] as a validation tool, and set the protocol parameters to the default values for 802.11b, as listed in Table 1, where a slot is equal to 20 µs and δ denotes the propagation delay. In the simulation, one uses the Dumb Agent routing protocol. Each simulation value is an average over 5 simulation runs, where each run was for 100 seconds. A buffer size of 1000 packets is used in the simulation to mimic an infinite buffer.

In the experiment, one considers 4 ACs: AC 0, AC 1, AC 2, AC 3. one runs simulations for homogeneous traffic (where $[L_0, L_1, L_2, L_3]$=[500,500,500,500]) and heterogeneous traffic (where $[L_0, L_1, L_2, L_3]$=[500,80,400,800]). The other parameter settings are as follows: $[n_0,n_1,n_2,n_3]$= [10,*,*, 5] and $[\lambda_0,\lambda_1,\lambda_2,\lambda_3]$=[*,40,20,10] (unit: packets per second), where * represents the adjustable parameter value. In simulation, one considers two cases. In the first case, AC 0 nodes are in saturation operation while other nodes are in non-saturation operations, where one sets $\lambda_0$=400 to mimic the saturation operation and label the simulation results with "sim_AC0_sat". In the second case, all nodes are in non-saturation operation, where one sets $\lambda_0$=40 for the non-saturation operation and label the simulation results with "sim_AC0_nsat".

E.1. Homogeneous Tragic

In this section, one considers homogeneous traffic.

FIG. 1 plots the admission region of AC 1 when $n_2$=4, 10,16,22,28. In this experiment, one changes $n_2$ and then find the maximum allowable $n_1$. For the theoretical result, $n_1$ is calculated by (11). For the simulation result, if accepting a new AC 1 node will cause the total throughput of AC 1 nodes to be less than their total offered loads, $n_1$ is set to the current number of AC 1 nodes excluding the new AC 1 node. From this figure, one can see that $n_1$ decreases as $n_2$ increases. One has the following observations.

When AC 0 is in saturation operation, the theoretical results slightly overestimate the corresponding simulation results. Concretely speaking, each simulation result is less than 1 than the corresponding theoretical result for $n_2$=4, 16, 22, 28, and the former is less than 2 than the latter for $n_2$=10.

When AC 0 is in non-saturation operation, the theoretical results slightly underestimate the corresponding simulation results. Concretely speaking, each simulation result is more than 1 than the corresponding theoretical result for $n_2$=4, 10, 16, 22, and the two results are equal for $n_2$=28.

The above observations imply that the maximum allowable node number is sensitive to the traffic regime (i.e., saturation or non-saturation). One explanation is: one uses the basic mode to resolve collision for homogeneous traffic, so that collisions occur during packet transmission and therefore the overhead is large if the packet size is long; as a result, the overall overhead when the offered load approaches the capacity of the system but the system is still in non-saturation, might be obviously less than that when the system is in saturation operation.

Figure 2:
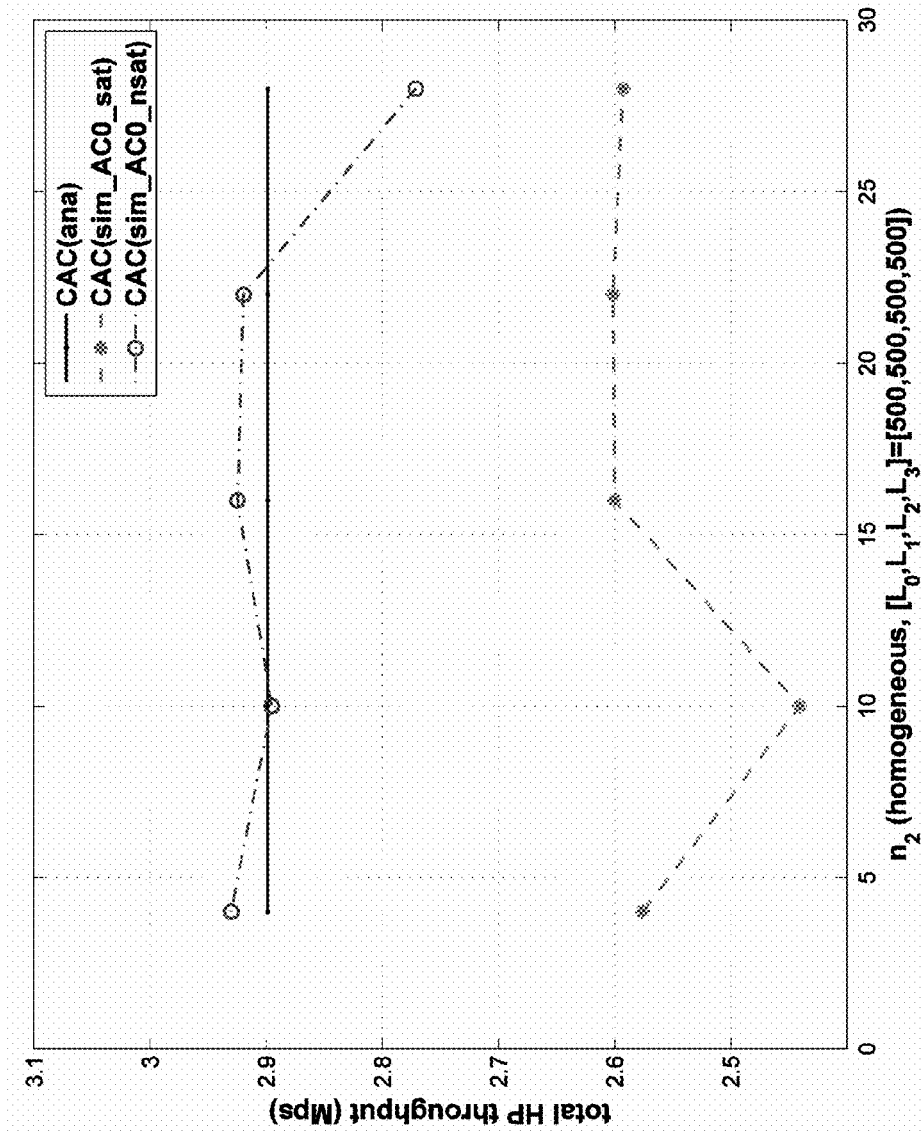
FIG. 2 depicts total HP throughput for homogeneous traffic when $n_2$=4, 10, 16, 22, 28 for homogeneous traffic.

FIG. 2 plots the total HP throughput when $n_2$=4, 10, 16, 22, 28, where the theoretical result is calculated by (15). From this figure, one can see that the maximum total HP throughput remains unchanged, regardless of how $n_2$ varies. For the simulation results, one has the following observations.

When AC 0 is in saturation operation, the maximum allowable traffic loads are slightly less than the corresponding theoretical result, because the maximum allowable $n_1$ is less than the corresponding theoretical result (as shown in FIG. 1).

When AC 0 is in non-saturation operation, the maximum allowable traffic loads slightly fluctuate around the corresponding theoretical result, because the maximum allowable $n_1$ is slightly larger than or equal to the corresponding theoretical result (as shown in FIG. 1).

E.2. Heterogeneous Traffic

In this section, one considers heterogeneous traffic.

Figure 3:
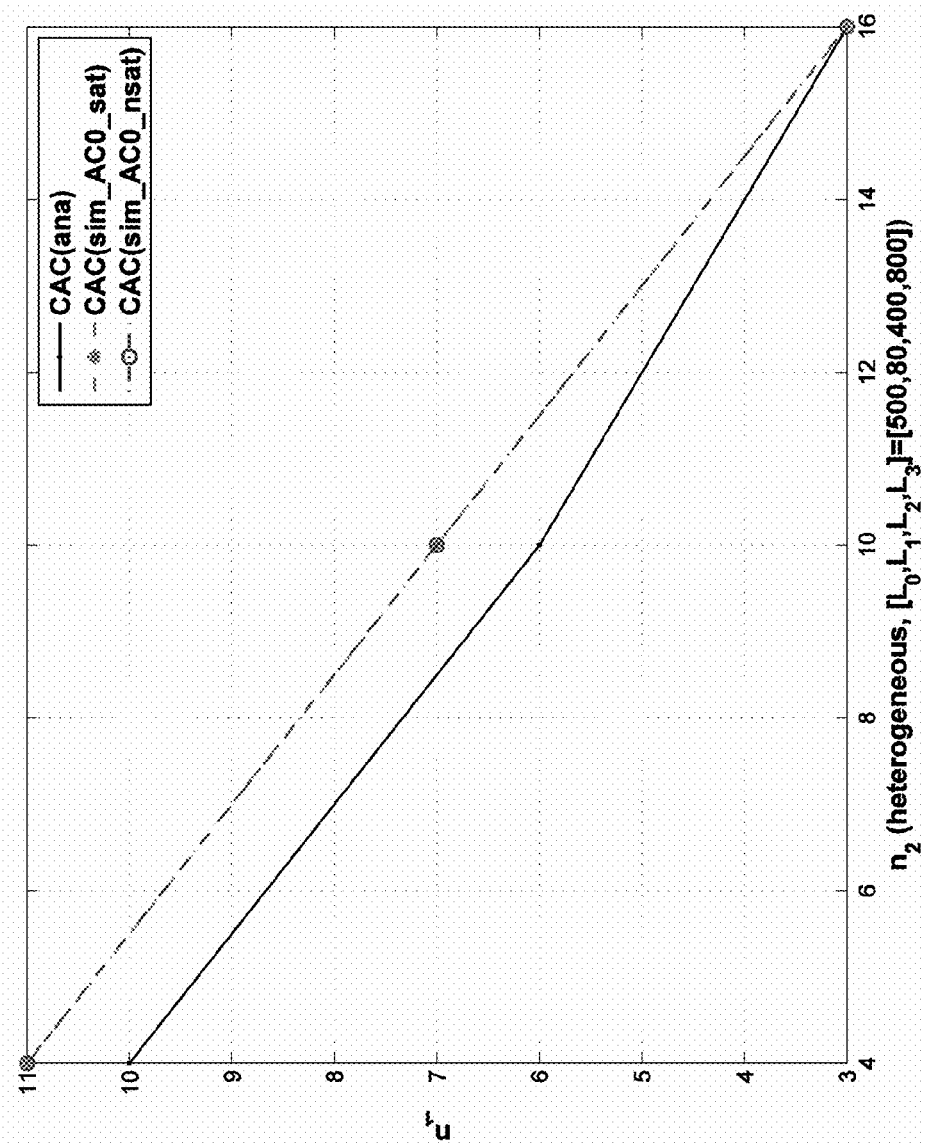
FIG. 3 depicts admission region of AC 1 when $n_2$=4, 10, 16 for heterogeneous traffic.

FIG. 3 plots the admission region of AC 1 when $n_2$=4, 10, 16. In this experiment, one changes $n_2$ and then find the maximum allowable $n_1$. For the theoretical result, $n_1$ is calculated by (16). For the simulation result, if accepting a new AC 1 node will cause the total throughput of AC 1 nodes to be less than their total offered loads, $n_1$ is set to the current number of AC 1 nodes excluding the new AC 1 node. From this figure, one can see that $n_1$ decreases as $n_2$ increases. One has the following observations.

Whether AC 0 is in saturation operation or in non-saturation operation, both simulation results are the same for each value of $n_2$; and the theoretical results slightly underestimate the corresponding simulation results. It implies that the maximum allowable node number is insensitive to the traffic regime (i.e., saturation or non-saturation). This is a distinct difference from the case of homogeneous traffic. One explanation is: one uses the RTS/CTS mechanism to resolve collision for heterogeneous traffic, and hence the RTS/CTS overhead is fixed regardless of the packet size; as a result, the overall overhead when the offered load approaches the capacity of the system but the system is still in non-saturation, is almost the same as that when the system is in saturation operation.

Figure 4:
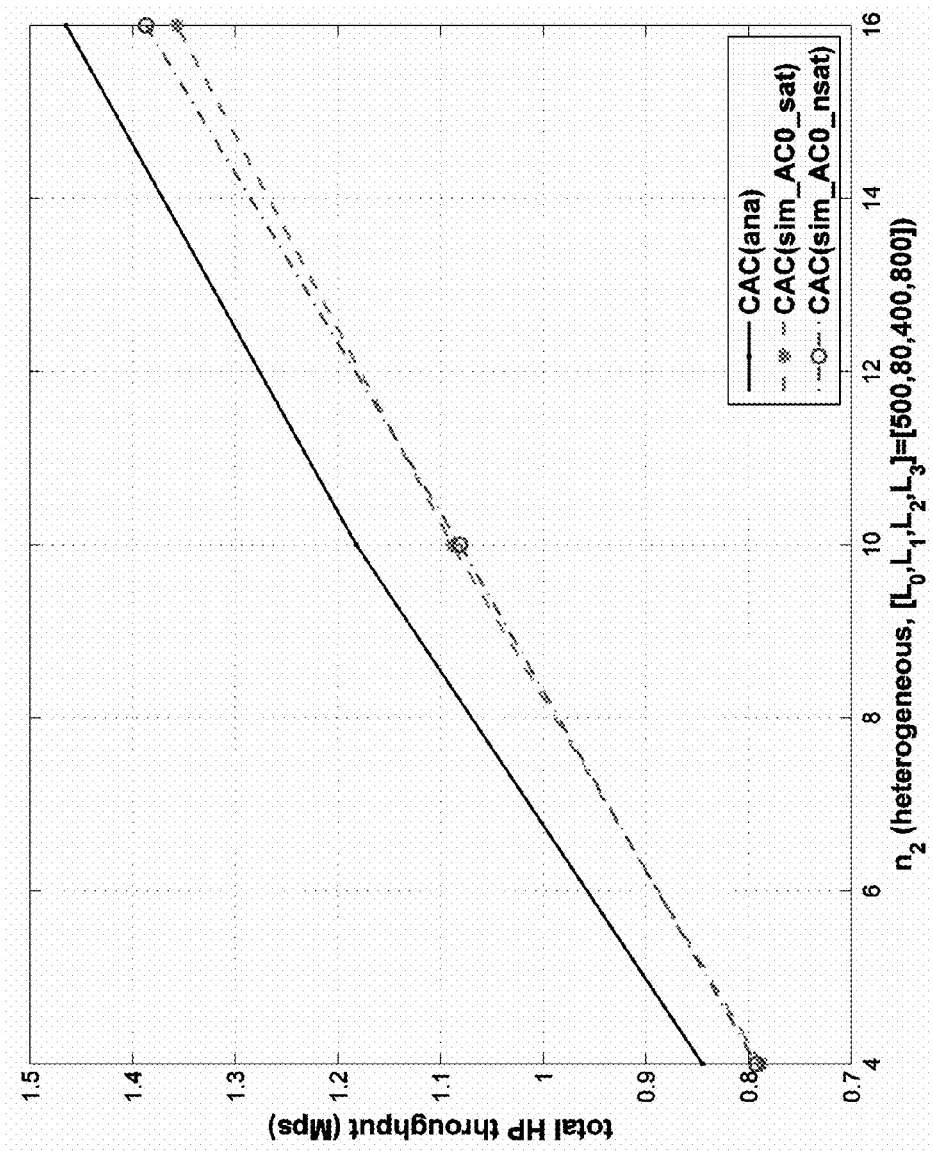
FIG. 4 depicts total HP throughput when $n_2$=4, 10, 16 for heterogeneous traffic.

FIG. 4 plots the total HP throughput when $n_2$=4, 10, 16, where the theoretical result is calculated by (9). From this figure, one can see that for the theoretical result, the maximum total HP throughput increases as $n_2$ increases. The reason is that AC 2 has a large packet size than AC 1 and therefore increasing the number of AC 2 will increase the throughput. This also implies that the system capacity varies with the heterogeneous traffic characteristics (i.e., the packet size, the node number, and the packet arrival rate). This is another distinct difference from the case of homogeneous traffic. In addition, one also observes that (i) when AC 0 is in saturation and non-saturation operations, both simulation values of the total HP throughput are almost the same for each value of $n_2$, because both simulation values of the maximum allowable $n_1$ are equal, as shown in FIG. 3; (ii) the theoretical results are slightly larger than the corresponding simulation results.

E.3. Convergence Speed

In this section, one demonstrates the convergence speed of the CoD scheme. One considers heterogeneous traffic, when $n_2$=10, $n_1$=7, and all other parameter settings are the same as those in FIG. 3. In the simulation, the targets of the total delay, respectively, are 25 ms, 50 ms, and 100 ms for AC 0, AC 1, AC 2. For each AC i (i=0; 1; 2), one is concerned with how fast that the CoD scheme makes the average total delay converge to its target value.

Figure 5A:
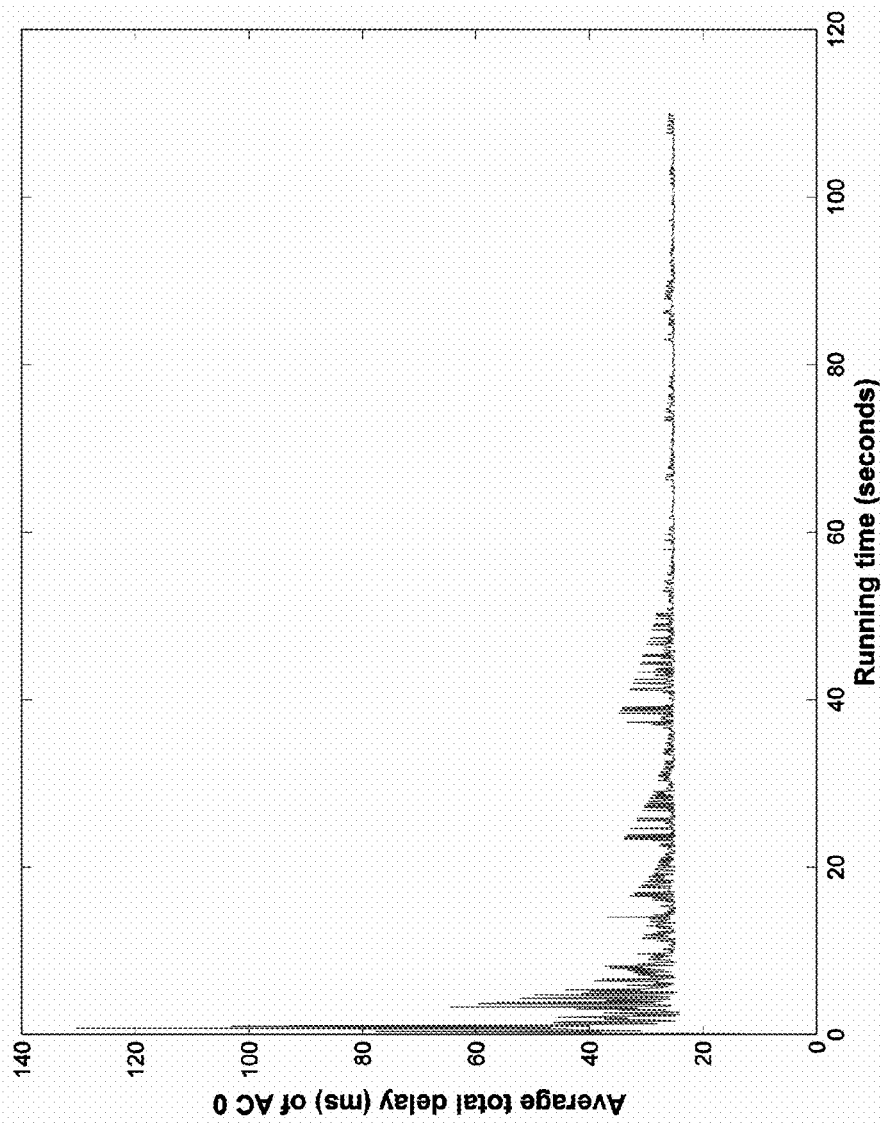
FIG. 5a depicts the average delay vs running time for AC 0.
Figure 5B:
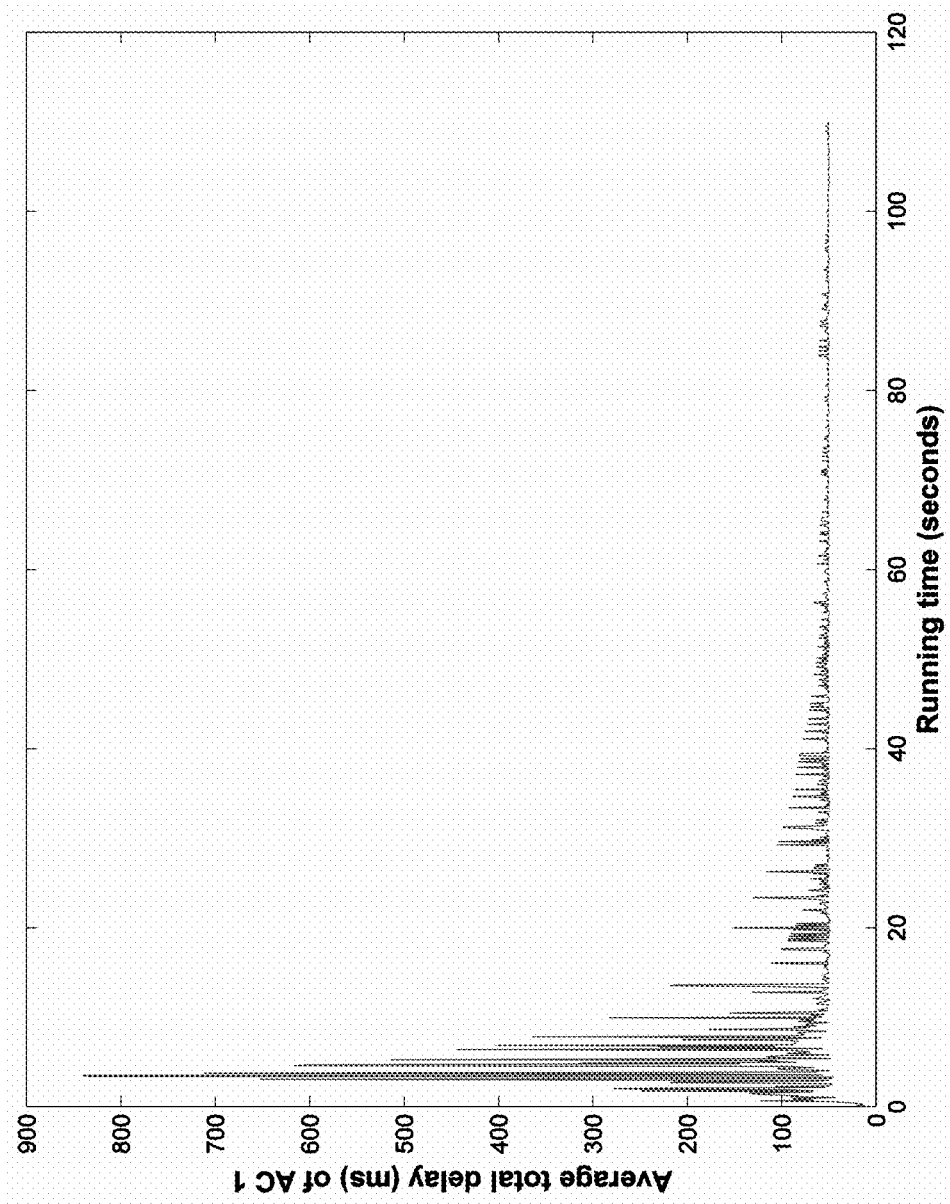
FIG. 5b depicts the average delay vs running time for AC 1.
Figure 5C:
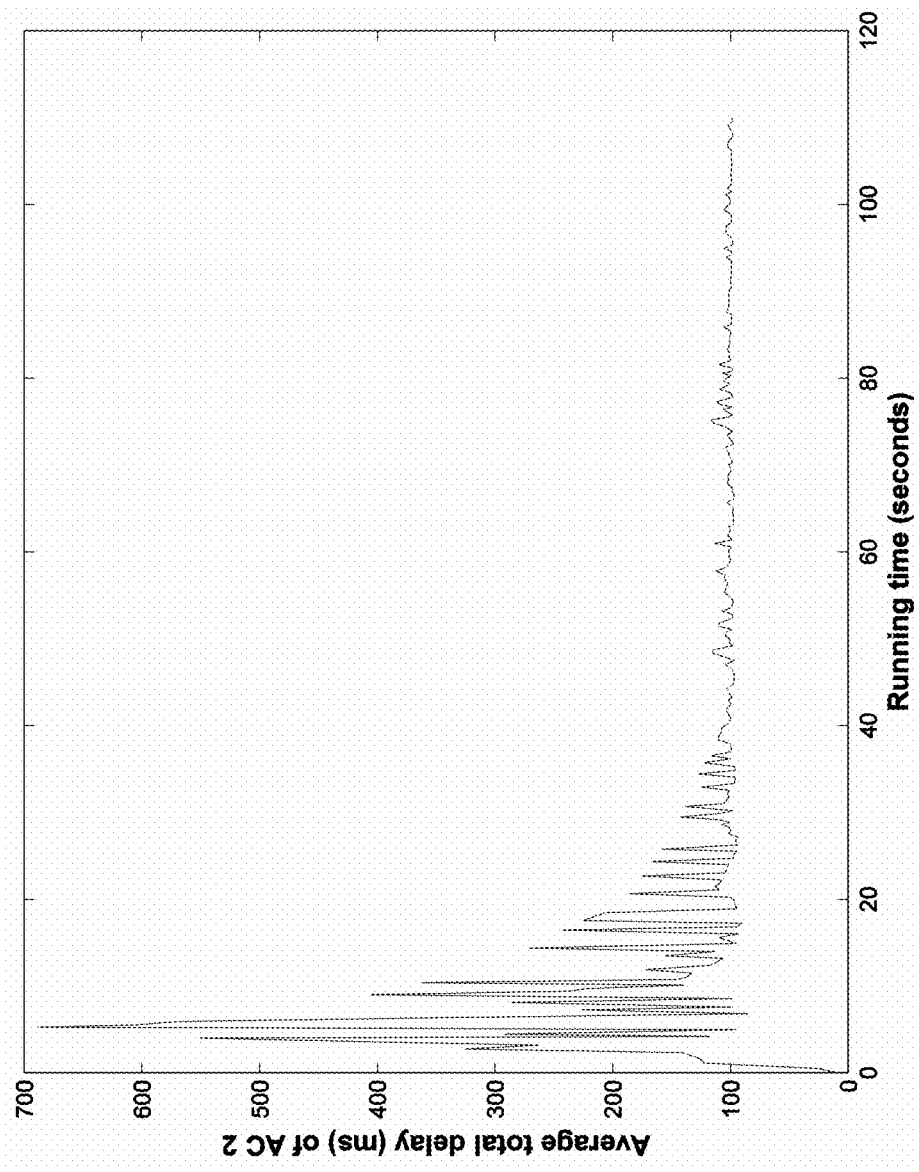
FIG. 5c depicts the average delay vs running time for AC 2.

FIG. 5(a)-(c), respectively, plot the average total delay vs. the running time for AC 0, AC 1, and AC 2, where the average total delay is calculated by (1). From the three subfigures, one can see that the average delay of each AC first increases for a while, then decreases quickly, and finally converges to its target delay after 60 seconds. The reasons are explained as follows. At the beginning, each AC node has the same intimal CW value of 400, which are too large for the target delay. Then all AC nodes simultaneously start to decrease their CWs. When all CW sizes become small, they will cause many packet collisions, leading to large delays. After that, the CoD scheme makes all ACs adjust their respective CWs according to their respective delay targets. As a result, the average delay starts to decrease and finally converges to the target value.

Figure 7:
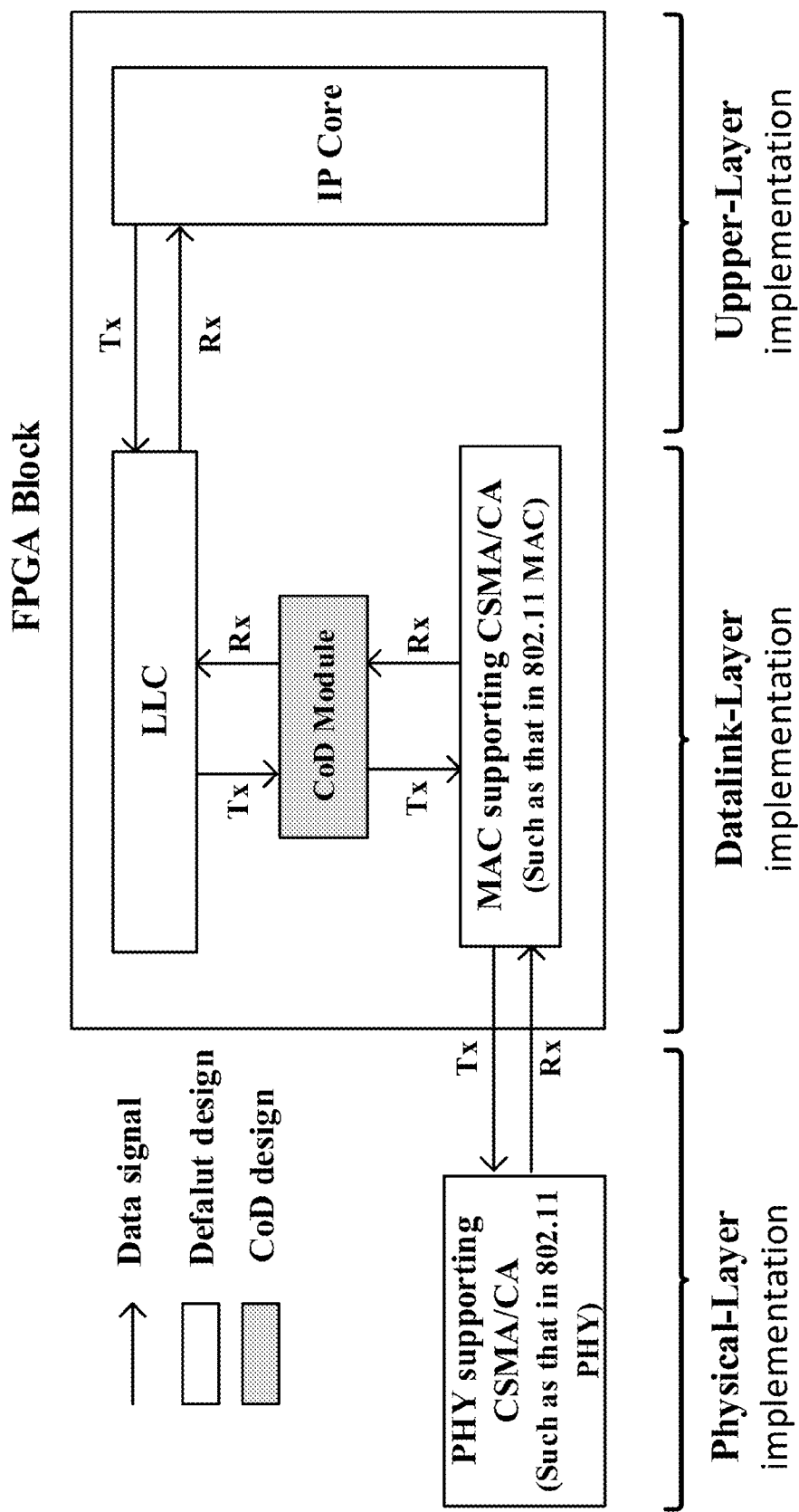
FIG. 7 depicts an overview of CoD hardware implementation for each node and the AP.

According to an embodiment of the present invention, an FPGA-based implementation is specified for CoD. 802.11 MAC protocol consists of (a) CSMA/CA and (b) the binary exponential algorithm. The MAC design keeps (a) unchanged but replaces (b) by CoD. FIG. 7 illustrates the implementation framework for each node and the AP, which includes off-the-shelf components (i.e., 802.11 PHY, 802.11 LLC, and 802.11 MAC supporting CSMA/CA), and the newly proposed CoD module.

As illustrated below, one finishes the proof of Theorem 2.

Proof of Theorem 2: one first defines four types of virtual slots: (i) an idle MAC slot with probability $1-P_b$, (ii) one successful transmission time of an LP node with probability $P_{s_0}$, one collision time with probability $P_c$, and one successful transmission time of an HP node with probability $P_{s_h} \Sigma_{i=1}^{I} P_{s_i}$, where $1-P_b+P_{s_0}+P_c+P_{s_h}=1$.

Figure 6:
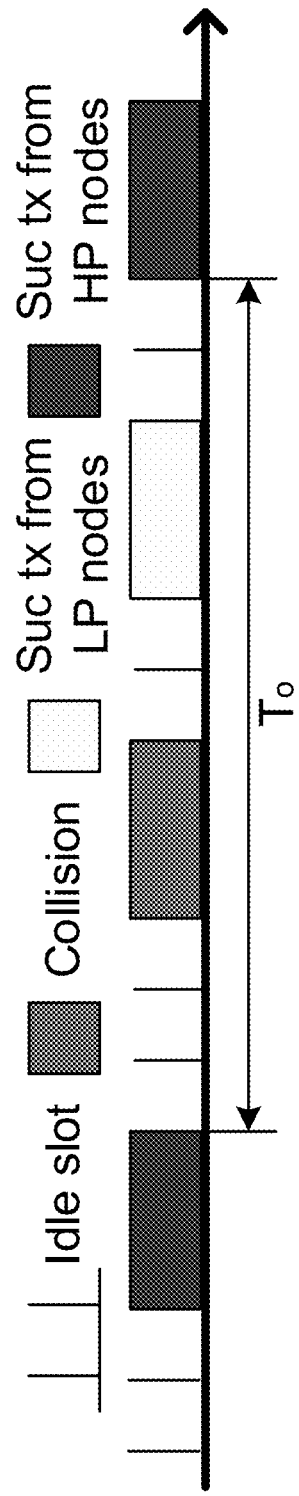
FIG. 6 depicts the average time between two consecutive successful transmission from all HP nodes.

Let $T_o$ denote the interval between when one successful transmission from HP nodes ends and when the next successful transmission from HP nodes begins, as shown in FIG. 6. Clearly, $T_o$ contains the first three types of virtual slots.

Let $\overline{T}_o$ denote the mean of $T_o$. To maximize the effective bandwidth occupied by HP nodes, one should minimize $\overline{T}_o$.

Below, one first expresses $\overline{T}_o$, and then find the optimal $\beta^+$ that minimizes $\overline{T}_o$.

Let $X^o$ denote the number of the virtual slots during $T_o$. Since a virtual slot during $T_o$ appears with probability $1-P_{s_h}$, $X^o$ follows a geometric distribution with parameter $P_{s_h}$ and therefore its mean $\overline{X}^o=1/P_{s_h}-1$.

Let $\Omega^o$ be a random variable representing the length of a virtual slot during $T_o$. $\Omega^o$ takes three types of values depending on the thee types of virtual slots during $T_o$. In terms of $P_b$, $P_{s_0}$, and $P_c$, one defines $\Omega^o$ as follows:

$$\Omega^o = \begin{cases} \sigma & w.p. \quad \frac{1-P_b}{1-P_b+P_{s_0}+P_c}, \\ T_{s_0} & w.p. \quad \frac{P_{s_0}}{1-P_b+P_{s_0}+P_c}, \\ T_c & w.p. \quad \frac{P_c}{1-P_b+P_{s_0}+P_c}, \end{cases} \quad (18)$$

where $T_{s_0}$, $T_c$, $P_b$, $P_{s_0}$, $P_c$ are defined in (2). Then the mean $\overline{\Omega}^o$ can be easily calculated by (18).

Then $\overline{T}_o$ is equal to the mean time of a virtual slot, $\overline{\Omega}^o$, times the mean number of virtual slots $\overline{X}^o$. Noting that $1-P_b+P_{s_0}+P_c+P_{s_h}=1$, one has $$\overline{T}_o = \overline{\Omega}^o \cdot \overline{X}^o \quad (19)$$

$$= \frac{\sigma(1-P_b)+T_{s_0}P_{s_0}+T_cP_c}{1-P_b+P_{s_0}+P_c} \cdot \frac{1-P_{s_h}}{P_{s_h}}$$

$$= \frac{\sigma(1-P_b)+T_{s_0}P_{s_0}+T_cP_c}{P_{s_h}}$$

Define $\overline{T}_0^+(\beta^+) \triangleq \lim_{n\to\infty} \overline{T}_0^+$. Let $C_2 \triangleq \sigma - T_c + (T_{s_0}-T_c)C_1/C_0$. Taking $n \to \infty$ for both sides in (19) and applying (5), one has $$\overline{T}_o^+(\beta^+) = \frac{\sigma[e^{-\beta^+}C_0]+T_{s_0}[e^{-\beta^+}C_1]+T_c[1-e^{-\beta^+}(C_0+C_1+\beta^+C_0)]}{\beta^+ e^{-\beta^+}C_0}$$

$$= \frac{\sigma+T_{s_0}\frac{C_1}{C_0}+T_c\left[\frac{e^{\beta^+}}{C_0}-\left(1+\frac{C_1}{C_0}+\beta^+\right)\right]}{\beta^+}$$

$$= \frac{\left[\sigma-T_c+(T_{s_0}-T_c)\frac{C_1}{C_0}\right]+T_c\left[\frac{e^{\beta^+}}{C_0}-\beta^+\right]}{\beta^+}$$

$$= \frac{C_2+T_c\left[\frac{e^{\beta^+}}{C_0}-\beta^+\right]}{\beta^+}$$

To minimize $\overline{T}_o^+(\beta^+)$, one sets the first derivative of $\overline{T}_o^+(\beta^+)$ with respect to $\beta^+$ to zero. This leads to $$T_c\left(\frac{e^{\beta^+}}{C_0}-1\right)\beta^+ = C_2+T_c\left(\frac{e^{\beta^+}}{C_0}-\beta^+\right)$$

$$T_c\frac{e^{\beta^+}}{C_0}\beta^+ = C_2+T_c\frac{e^{\beta^+}}{C_0}$$

$$T_c\beta^+ = C_0C_2e^{-\beta^+}+T_c$$

$$T_c(\beta^+-1) = C_0C_2e^{-\beta^+}$$

$$(\beta^+-1)e^{(\beta^+-1)} = C_0C_2e^{-1}/T_c.$$

Then $\beta^+-1=W_0(C_0C_2e^{-1}/T_c)$ or $W_{-1}(C_0C_2e^{-1}/T_c)$. One has $\beta_{opt}^+=W_0(C_0C_2e^{-1}/T_c)+1\geq 0$, since only $W_0(C_0C_2e^{-1}/T_c)>-1$ for $C_0C_2e^{-1}/T_c \in (-1/e, 0)$.

As a result, one obtains (12) since $$\frac{C_0 C_2}{eT_c} = \frac{C_0(\sigma - T_c) + C_1(T_{s_0} - T_c)}{eT_c}.$$

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of the processes of the present invention. The storage media can include, but is not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A computer-implemented method for providing admission control to a wireless network system, the system having one or more high-priority (HP) nodes, one or more low-priority (LP) nodes, contending for access to an access point, the method comprising:

categorizing the system into one LP access category (AC) and I HP ACs, wherein the LP AC has $n_0$ LP nodes, and each of the LP nodes has a same packet size $L_0$ and generates a first random backoff count uniformly distributed in $[0,CW_0]$ for each of new transmission or retransmission, where $CW_0$ is a pre-configured contention window (CW) size required by a fixed-CW algorithm, and wherein the HP AC i, where $1 \leq i \leq I$, has $n_i$ HP nodes, where $n_1 + \ldots + n_I = n$ is a total number of HP nodes, and each of the HP nodes in the HP AC i has a same packet size $L_i$ and a same packet arrival rate $\lambda_i$, and generates a second random backoff count uniformly distributed in $[0,CWD]$ for each of new transmission or retransmission, where CWD is a contention window size dynamically set by a dynamic-CW algorithm;

setting all of the LP and HP nodes having the packet size with L;

determining an optimal asymptotic HP attempt rate as follows:

$$\beta_{opt}^+ = W_0\left(\frac{C_0(\sigma - T_c)}{eT_c}\right) + 1$$

where $w_0(\cdot)$ is a Lambert W(z) function, $W(z)e^{W(z)} = z$, for any complex number z, σ is a length of a media access control MAC slot, $C_0 \triangleq (1-\beta_0)^{n_0}$, $n_0$ is the total number of LP nodes, $\beta_0$ is an average attempt rate per slot for each of the LP AC nodes, $T_c$ is a mean time in slots for an unsuccessful transmission;

determining an optimal asymptotic HP throughput $\Gamma_1(\beta_{opt}^+)$ by substituting the $\beta_{opt}^+$ for $\beta^+$ in $\Gamma_1(\beta^+)$ as follows:

$$\Gamma_1(\beta^+) = \frac{e^{-\beta^+}\beta^+ C_0 L}{T_c + e^{-\beta^+}[\sigma - T_c]C_0}$$

where $\Gamma_1(\beta^+)$ is an asymptotic total HP throughput, and $\beta^+$ is a total asymptotic HP attempt rate;

determining one or more numerical values of operating parameters including $\lambda_i$ such that $\Sigma_{i=1}^{I} n_i \lambda_i L < \Gamma_1(\beta_{opt}^+)$, where $\Sigma_{i=1}^{I} n_i \lambda_i L$ is a total traffic load of all of the HP ACs;

determining the CWD based on a requirement of total delay of a flow.

2. The method of claim 1, wherein the total delay of the flow is related to the determined numerical values of $\lambda_i$.

3. The method of claim 1, wherein the fixed-CW algorithm is a variant of binary-exponential-backoff (BEB) algorithm.

4. The method of claim 1, wherein the $CW_0 > 1$.

5. The method of claim 1, wherein the $\beta_0$ is calculated as follows:

$\beta_0 = 2/(CW_0 + 1)$.

6. The method of claim 1, wherein the admission control is for homogeneous traffic.

7. A computer-implemented method for providing admission control to a wireless network system, the system having one or more high-priority (HP) nodes, one or more low-priority (LP) nodes, contending for access to an access point, the method comprising:

categorizing the system into one LP access category (AC) and I HP ACs, wherein the LP AC has $n_0$ LP nodes, and each of the LP nodes has a same packet size $L_0$ and generates a first random backoff count uniformly distributed in $[0, CW_0]$ for each of new transmission or retransmission, where $CW_0$ is a pre-configured contention window (CW) size required by a fixed-CW algorithm, and wherein the HP AC i, where $1 \leq i \leq I$, has $n_i$ HP nodes, where $n_1 + \ldots + n_I = n$ is a total number of HP nodes, and each of the HP nodes in the HP AC i has a same packet size $L_i$ and a same packet arrival rate $\lambda_i$, and generates a second random backoff count uniformly distributed in $[0,CWD]$ for each of new transmission or retransmission, where CWD is a contention window size dynamically set by a dynamic-CW algorithm;

determining an optimal asymptotic aggregate attempt rate as follows:

$$\beta_{opt}^+ = W_0\left(\frac{C_0(\sigma - T_c) + C_1(T_{s_0} - T_c)}{eT_c}\right) + 1$$

where $w_0(\cdot)$ is a Lambert W(z) function, $W(z)e^{W(z)} = z$, for any complex number z, σ is a length of a media access control MAC slot, $C_0 \triangleq (1-\beta_0)^{n_0}$,
$C_1 \triangleq n_0 \beta_0 (1-\beta_0)^{n_0-1}$,
$n_0$ is the total number of LP nodes,
$\beta_0$ is an average attempt rate per slot for each of the LP AC nodes,
$T_c$ is a mean time in slots for an unsuccessful transmission,
$Ts_0$ is a mean time in slots of a successful transmission for each of the AC 0 nodes,
determining a maximum HP throughput $\Gamma_2(\beta_{opt}^+, r_1, L, r_I)$ by substituting the $\beta_{opt}^+$ for $\beta^+$ in $\Gamma_2(\beta^+, r_1, L, r_I)$ as follows:

$$\Gamma_2(\beta^+, r_1, L, r_I) = \frac{\beta^+ e^{-\beta^+} C_0 D_0(r_1, L, r_I)}{e^{-\beta^+} C_0[\sigma + \beta^+ D_1(r_1, L, r_I) + C_1 T_{s_0}/C_0] + [1 - e^{-\beta^+}(C_0 + C_1 + \beta^+ C_0)]T_c}$$

where $\Gamma_2(\beta^+, r_1, L, r_I)$ is a maximum system throughput,
$\beta^+$ is a total asymptotic HP attempt rate, $$D_0(r_1, L, r_I) = \frac{\sum_{i=1}^{I} r_i}{\sum_{i=1}^{I} \frac{r_i}{L_i}},$$

$$D_1(r_1, L, r_I) = \frac{\sum_{i=1}^{I} \frac{r_i}{L_i} T_{s_i}}{\sum_{i=1}^{I} \frac{r_i}{L_i}},$$

$r_i$ is a ratio between HP AC i and AC 1 throughput,
$T_{s_i}$ is a mean time in slots of a successful transmission for each of the AC i nodes,
determining one or more numerical values of operating parameters including $\lambda_1$ such that $\sum_{i=1}^{I} n_i \lambda_i L_i < \Gamma_1(\beta_{opt}^+, r_1, L, r_I)$
where $\sum_{i=1}^{I} n_i \lambda_i L_i$ is a total traffic load of all of the HP ACs;
determining the CWD based on a requirement of total delay of a flow.

8. The method of claim 7, wherein the total delay of the flow is related to the determined numerical values of $\lambda_i$.

9. The method of claim 7, wherein the fixed-CW algorithm is a variant of binary-exponential-backoff (BEB) algorithm.

10. The method of claim 7, wherein the $CW_0 > 1$.

11. The method of claim 7, wherein the $\beta_0$ is calculated as follows:

$\beta_0 = 2/(CW_0+1)$.

12. The method of claim 7, wherein the admission control is for heterogeneous traffic.

* * * * *